United States Patent [19]

Hosoya

[11] Patent Number: 4,682,861
[45] Date of Patent: Jul. 28, 1987

[54] PROJECTION LENS
[75] Inventor: Jun Hosoya, Tokyo, Japan
[73] Assignee: Canon Kabushiki Kaisha, Tokyo, Japan
[21] Appl. No.: 747,029
[22] Filed: Jun. 20, 1985
[30] Foreign Application Priority Data Jun. 25, 1984 [JP] Japan ................................. 59-130635
Jul. 27, 1984 [JP] Japan ................................. 59-132297
Jul. 27, 1984 [JP] Japan ................................. 59-132298

[51] Int. Cl.$^4$ .......................... G02B 9/34; G02B 13/18
[52] U.S. Cl. ..................................................... 350/432
[58] Field of Search ................... 350/432, 469

[56] References Cited

U.S. PATENT DOCUMENTS 3,868,173  2/1975  Miles et al.
4,300,817  11/1981 Betensky .
4,348,081  9/1982  Betensky ............................ 350/432
4,526,442  7/1985  Betensky .

*Primary Examiner*—John K. Corbin
*Assistant Examiner*—Rebecca D. Gass
*Attorney, Agent, or Firm*—Fitzpatrick, Cella, Harper & Scinto

[57] ABSTRACT

A projection lens for enlarging and projecting a television image on a screen including: a first lens L1 having a positive refracting power; a second lens L2 having a positive refracting power and a convex surface which is located at the side of L2 nearer to the image and which has a larger curvature than that at the side of L2 nearer to the screen; a third lens L3 which consists of a meniscus lens having a concave surface located at the side of L3 nearer to the image; and a fourth lens L4 having a concave surface which is located at the side of L4 nearer to the screen and which has a larger curvature than that at the side of L4 nearer to the image. The lenses L1, L2, L3 and L4 are arranged from the side of the screen in the order named. The combined refracting power of the second and third lenses is larger than that of the first lens. At least one nonspherical surface is provided in the first lens, and at least one nonspherical surface is provided in the second, third and fourth lenses.

6 Claims, 14 Drawing Figures

SPHERICAL ABERRATION    ASTIGMATISM

TRANSVERSE ABERRATION

SPHERICAL ABERRATION   ASTIGMATISM

TRANSVERSE ABERRATION

SPHERICAL ABERRATION | ASTIGMATISM

TRANSVERSE ABERRATION

TRANSVERSE ABERRATION

FIG.14

SPHERICAL ABERRATION / ASTIGMATISM

TRANSVERSE ABERRATION

PROJECTION LENS

BACKGROUND OF THE INVENTION

1. Field of the Invention

The present invention relates to a projection lens and, more particularly, to an enlargement projection lens suitable for projecting an image formed by an electronic imaging tube on a screen as an enlarged image.

2. Description of the Prior Art

In full-color image display, red, blue and green cathode-ray tubes are used for a conventional video image projection lens. The red, blue and green images are projected by the projection lens onto the screen.

A preferable projection lens is a wide-angled lens with a small F number. When the F number is small, a brighter image can be obtained. The wide angle provides a desired projection image at a short projection distance with the advantage that the projection lens can be made compact as a whole.

Conventional projection lenses include spherical lenses and nonspherical lenses having nonspherical surfaces. It is difficult for a spherical lens to achieve high performance when the number of lens components is decreased. For this reason, nonspherical lenses have been recently used as projection lenses.

Conventional projection lenses having nonspherical surfaces for correcting aberration have a long history of development as exemplified by British Patent Publication No. 593514. The projection lens disclosed by this patent comprises: a first group which consists of a compound lens of a double-convex lens and a double-concave lens and which has a nonspherical surface as a first surface so as to correct aberration depending on an aperture and chromatic aberration along an optical axis; a positive second group which consists of two plano-convex lenses and which has a convex surface facing the screen; and a third group having a negative refracting power for an image plane flattening means. With the above arrangement, spherical aberration and coma are corrected by the first group, and curvature of field distortion is corrected by the third group. Spherical aberration and coma correction by the first group are not sufficient. In particular, coma correction is poor. For this reason, flare occurs in a focusing plane, and wide-angle projection having a half view angle of 25° or more cannot be provided.

SUMMARY OF THE INVENTION

It is, therefore, an object of the present invention to provide a wide-angle projection lens wherein coma which degrades imaging quality can be properly corrected. A meniscus lens as a third lens to be described later is used to correct coma.

BRIEF DESCRIPTION OF THE DRAWINGS

FIGS. 1 to 3 are sectional views of projection lenses according to first to third embodiments of the present invention, respectively;

FIGS. 4 to 6 are graphs showing aberration curves of the projection lenses shown in FIGS. 1 to 3, respectively;

FIGS. 7 to 10 are sectional views of projection lenses according to fourth to seventh embodiments of the present invention, respectively; and FIGS. 11 to 14 are graphs showing aberration correction states of the projection lenses of FIGS. 7 to 10, respectively.

DETAILED DESCRIPTION OF THE PREFERRED EMBODIMENTS

Figure 1:
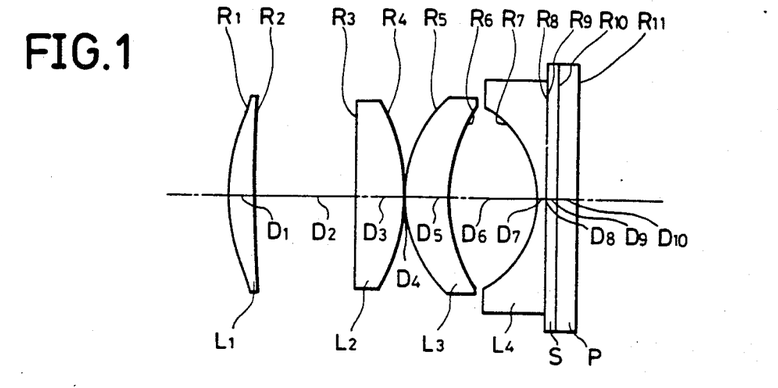

A projection lens according to an embodiment of the present invention, as shown in FIG. 1, comprises: a first lens L1 having a positive refracting power; a second lens L2 having a positive refracting power and a convex surface which is located at the side of L2 nearer to the image and which has a larger curvature than that at the side of L2 nearer to the screen; a third lens L3 which consists of a meniscus lens having a concentric or substantially concentric shape and a concave surface located at the side of L3 nearer to the image; and a fourth lens L4 having a concave surface which is located at the side of L4 nearer to the screen and which has a larger curvature than that at the side of L4 nearer to the image. The lenses L1, L2, L3 and L4 are arranged from the side of the screen in the order named. The combined refracting power of the second and third lenses is larger than that of the first lens. At least one nonspherical surface is provided in the first lens, and at least one nonspherical surface is provided in the second, third and fourth lenses.

The operation of the projection lens having the above arrangement will be described hereinafter.

The first lens has at least one nonspherical surface for correcting aberration depending on an aperture of the lens. The second lens has the positive refracting power mainly for focusing. The third lens comprises the meniscus lens having the concave surface facing the imaging tube and minimizes aberration of the optical axis thereof, thereby correcting aberration depending on the view angle, and out-of-axis aberration, especially coma. The fourth lens has the concave surface with a large curvature at the side of L4 nearer to the screen so as to correct aberration depending on view angle, especially, the curvature of field and distortion. In order to properly correct these out-of-axis aberrations and achieve a half view angle of 25° or more, at least one nonspherical surface is provided in the second, third and fourth lenses.

Spherical aberration and coma are corrected by the first lens, coma is corrected by the third lens, and the curvature of field and distortion are corrected by the fourth lens. In particular, the meniscus lens as a third lens having a concave surface facing the imaging tube can properly correct coma, as compared with a meniscus lens having a convex surface facing the imaging tube, a plano-convex lens (especially, a plano-convex lens having a convex surface facing the imaging tube), and a double-convex lens. In addition, the meniscus lens has a concentric or substantially concentric shape to minimize aberrations of the optical axis, thereby providing a high-performance projection lens.

Coma as a main cause of degradation in performance of the projection lens can be properly corrected, so that spherical aberration, curvature of field and distortion can also be properly corrected. Therefore, a high-performance projection lens having an F number of 1.2 or less and a half view angle of 25° or more can be obtained.

The object of the present invention can in principle be achieved as described above. Aberrations can be further corrected by considering the following items, and actual design time can be shortened.

If the refracting power of the entire system is $\phi$, a combined refracting power of the second and third lenses is $\phi_{2,3}$, a distance between the opposing surfaces of the first and second lenses is $D_2$, a radius of curvature of the surface of the third lens which is located on the side of L3 nearer to the screen is $R_5$, and a radius of curvature of the surface of the third lens which is located on the side of L3 nearer to the imaging tube is $R_6$, then the projection lens according to this embodiment satisfies the following conditions:

$$0.75 < \phi_{2,3}/\phi < 0.95 \quad (1)$$

$$0.4F < D_2 < 0.6F \quad (2)$$

$$0.45 < R_5/R_6 < 0.85 \quad (3)$$

The significance of the upper and lower limits in each condition will be described below.

Condition (1) is associated with a combined refracting power of the second and third lens. When the combined refracting power is below the lower limit, the refracting power of the first lens must be increased excessively, and spherical aberration cannot be corrected. However, when the combined refracting power exceeds the upper limit, out-of-axis aberration significantly occurs in the second and third lenses, especially the second lens, and proper correction cannot be performed for the following reason. When the positive power of the second and third lenses is increased, the negative power of the fourth lens must be increased to correct the curvature of field, thereby increasing distortion or the like and hence failing to provide a high-performance projection lens.

Condition (2) is associated with the distance between the first lens and the second lens. When the distance is below the lower limit, the focusing power of the out-of-axis light components becomes insufficient. A higher power of the out-of-axis light components for the second, third and fourth lenses is required. As a result, a wide-angle projection lens cannot be easily provided. However, when the distance exceeds the upper limit, the angle of the lens nearer to incidence of out-of-axis light on the rear surface (i.e., the surface on the side of the imaging tube) of the second lens is increased. As a result, out-of-axis aberration is increased.

Condition (3) is associated with a power ratio of the radius of curvature of the front surface of the third lens to that of the rear surface thereof and a meniscus property. If the ratio is below the lower limit, the power of the third lens is increased to increase aberrations on the axis and out of axis. As a result, the principal object (i.e., coma correction) cannot be achieved. However, when the ratio exceeds the upper limit, the power of the third lens is greatly reduced, and a higher power is required in the second lens. As a result, aberration caused by the second lens is increased and fails to correct distortion.

The lens data of the embodiments of the present invention will be described below. Reference symbols $R_1$, $R_2$, ... denote radii of curvature of the surfaces of the lenses, respectively; $D_1$, $D_2$, ..., thicknesses or air gaps between adjacent surfaces of adjacent lenses, respectively; $N_1$, $N_2$, ..., refractive indices of the lenses with respect to an e line (light having a wavelength of 546.1 nm), respectively; and $\nu 1'$, $\nu 2'$, ..., Abbe's numbers, respectively. The shape of the nonspherical surface is represented by a displacement $\bar{x}$ along the optical axis when the optical axis is defined as the x-axis in the orthogonal coordinate system as follows:

$$\bar{x} = R\{1 - \sqrt{(1 - H^2/R^2)}\} + AH^2 + BH^4 + CH^6 + DH^8 + EH^{10} + A'H^3 + B'H^5 + C'H^7 + D'H^9$$

where
H: the height from the optical axis
R: the radius of curvature at the vertex A, B, C, D, E,
A', B', C' and D': the nonspherical coefficient.

First Embodiment (FIG. 1)
Focal Length
F = 102.52   F No. = 1:1.2   2ω = 65°

| | | | |
|---|---|---|---|
| R1 = 120.885 | D1 = 13.82 | N1 = 1.49375 | ν1 = 57.4 |
| R2 = 1810.186 | D2 = 52.74 | | |
| R3 = −6542.547 | D3 = 26.97 | N2 = 1.60548 | ν2 = 60.7 |
| R4 = −107.071 | D4 = 0.33 | | |
| R5 = 74.413 | D5 = 22.00 | N3 = 1.49375 | ν3 = 57.4 |
| R6 = 91.968 | D6 = 47.61 | | |
| R7 = −58.153 | D7 = 5.00 | N4 = 1.51825 | ν4 = 64.1 |
| R8 = ∞ | D8 = 0.17 | | |
| R9 = ∞ | D9 = 6.10 | N5 = 1.44200 | ν5 = 55.8 |
| R10 = ∞ | D10 = 10.90 | N6 = 1.54212 | ν6 = 59.5 |
| R11 = 5000. | | | |

| | Nonspherical Surface | |
|---|---|---|
| | First Surface | Sixth Surface |
| A | 5.280 × 10$^{-4}$ | 0 |
| B | −2.377 × 10$^{-7}$ | 6.442 × 10$^{-7}$ |
| C | −3.505 × 10$^{-11}$ | −4.077 × 10$^{-10}$ |
| D | 2.927 × 10$^{-15}$ | 2.327 × 10$^{-13}$ |
| E | −2.268 × 10$^{-18}$ | −4.995 × 10$^{-17}$ |
| A' | 0 | −2.595 × 10$^{-6}$ |
| B' | 0 | −1.939 × 10$^{-10}$ |
| C' | 0 | −7.488 × 10$^{-13}$ |
| D' | 0 | −8.339 × 10$^{-17}$ |

Second Embodiment (FIG. 2)
F = 103.09   F No. = 1:1.2   2ω = 65°

| | | | |
|---|---|---|---|
| R1 = 138.291 | D1 = 10.02 | N1 = 1.49375 | ν1 = 57.4 |
| R2 = 551.418 | D2 = 42.75 | | |
| R3 = 347.059 | D3 = 29.76 | N2 = 1.60548 | ν2 = 60.7 |
| R4 = −104.888 | D4 = 10.21 | | |
| R5 = 142.523 | D5 = 22.04 | N3 = 1.49375 | ν3 = 57.4 |
| R6 = 290.336 | D6 = 49.17 | | |
| R7 = −57.800 | D7 = 5.00 | N4 = 1.51825 | ν4 = 64.1 |
| R8 = ∞ | D8 = 2.00 | | |
| R9 = ∞ | D9 = 6.10 | N5 = 1.44200 | ν5 = 55.8 |
| R10 = ∞ | D10 = 10.90 | N6 = 1.54212 | ν6 = 59.5 |
| R11 = 5000. | | | |

| | First Surface | Sixth Surface |
|---|---|---|
| A | −2.275 × 10$^{-4}$ | 0 |
| B | −3.371 × 10$^{-7}$ | 3.755 × 10$^{-7}$ |
| C | −1.120 × 10$^{-10}$ | −4.283 × 10$^{-10}$ |
| D | 2.480 × 10$^{-15}$ | 2.401 × 10$^{-13}$ |
| E | −2.861 × 10$^{-18}$ | −4.216 × 10$^{-17}$ |
| A' | 0 | 4.181 × 10$^{-6}$ |
| B' | 0 | −2.160 × 10$^{-9}$ |
| C' | 0 | −1.589 × 10$^{-12}$ |
| D' | 0 | 3.542 × 10$^{-17}$ |

Third Embodiment (FIG. 3)
F = 102.62781   F No. = 1:1.2   2ω = 65°

| | | | |
|---|---|---|---|
| R1 = 120.647 | D1 = 11.99 | N1 = 1.49375 | ν1 = 57.4 |

-continued

| | | | |
|---|---|---|---|
| R2 = 1098.831 | D2 = 61.56 | | |
| R3 = 816.601 | D3 = 19.43 | N2 = 1.60548 | ν2 = 60.7 |
| R4 = −111.921 | D4 = 0.12 | | |
| R5 = 71.218 | D5 = 19.82 | N3 = 1.49375 | ν3 = 57.4 |
| R6 = 85.199 | D6 = 49.68 | | |
| R7 = −59.534 | D7 = 5.00 | N4 = 1.51825 | ν4 = 64.1 |
| R8 = ∞ | D8 = 0.17 | | |
| R9 = ∞ | D9 = 6.10 | N5 = 1.44200 | ν5 = 55.8 |
| R10 = ∞ | D10 = 10.90 | N6 = 1.54212 | ν6 = 59.5 |
| R11 = 5000. | | | |

Nonspherical Surface

| | First Surface | Fourth Surface | Sixth Surface | Seventh Surface |
|---|---|---|---|---|
| A | $2.777 \times 10^{-14}$ | 0 | 0 | 0 |
| B | $-2.211 \times 10^{-7}$ | $4.302 \times 10^{-10}$ | $6.216 \times 10^{-7}$ | $-4.078 \times 10^{-9}$ |
| C | $-4.175 \times 10^{-11}$ | $1.452 \times 10^{-13}$ | $-4.016 \times 10^{-10}$ | $6.048 \times 10^{-12}$ |
| D | $2.750 \times 10^{-13}$ | $2.258 \times 10^{-17}$ | $2.401 \times 10^{-13}$ | $2.721 \times 10^{-15}$ |
| E | $-2.111 \times 10^{-18}$ | $9.156 \times 10^{-21}$ | $-5.141 \times 10^{-17}$ | $1.242 \times 10^{-18}$ |
| A' | 0 | 0 | $-1.400 \times 10^{-6}$ | 0 |
| B' | 0 | 0 | $2.759 \times 10^{-10}$ | 0 |
| C' | 0 | 0 | $-8.725 \times 10^{-13}$ | 0 |
| D' | 0 | 0 | $-6.806 \times 10^{-17}$ | 0 |

Figure 2:
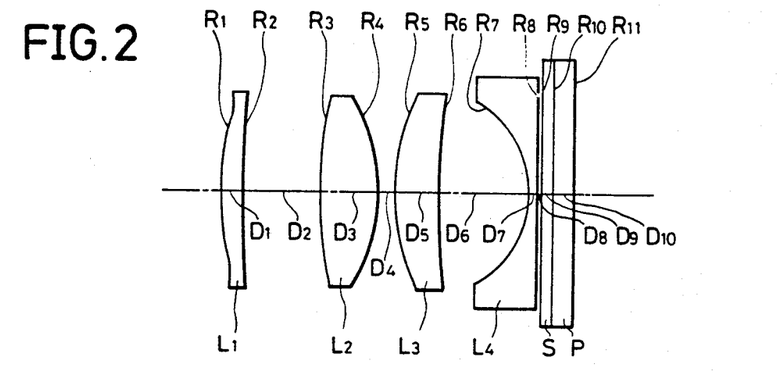
Figure 3:
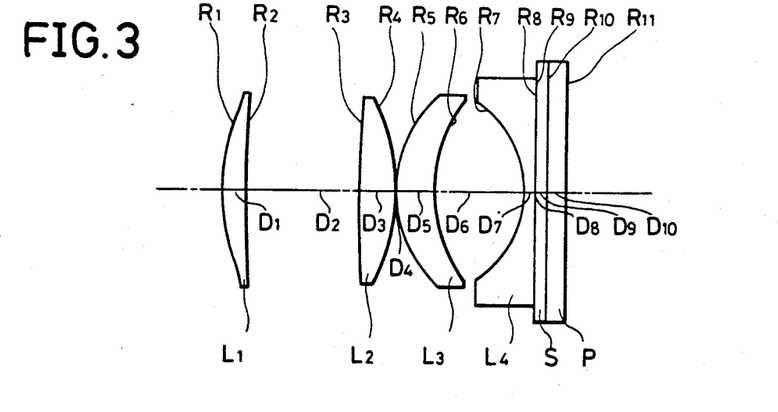

FIGS. 1, 2 and 3 are sectional views of projection lenses of the first to third embodiments, respectively. Referring to FIGS. 1 to 3, the arrangements include lenses $L_1, L_2, \ldots$, a liquid S filled between the projection lens and the imaging tube and a faceplate P of the imaging tube.

Figure 4:
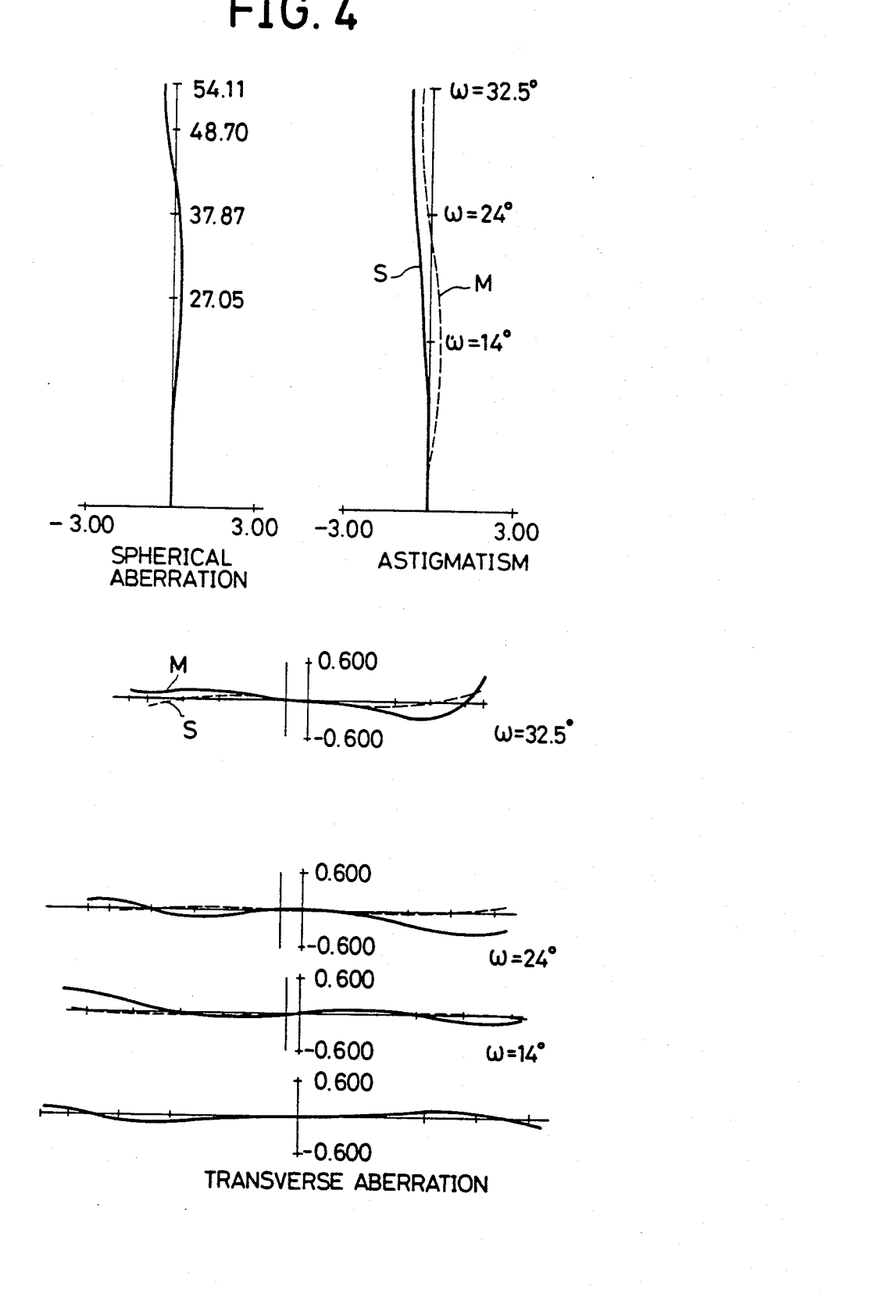
Figure 5:
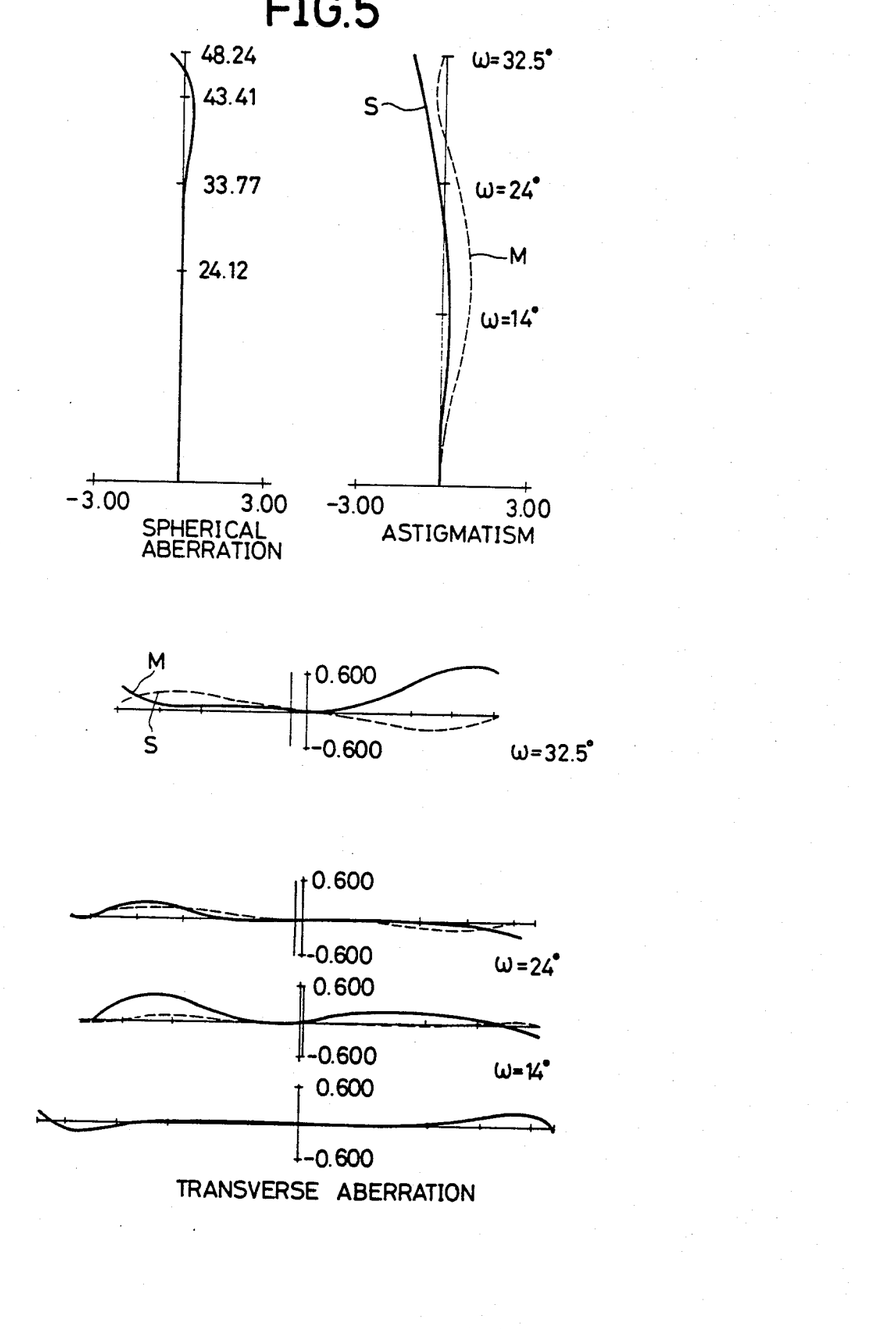
Figure 6:
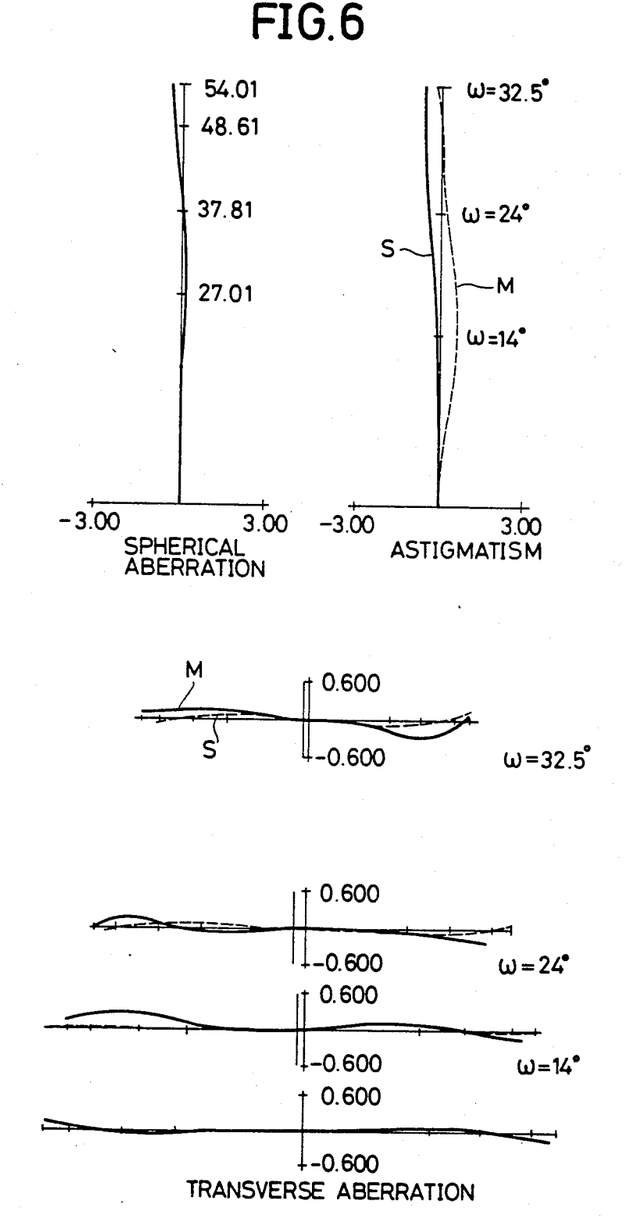
Figure 7:
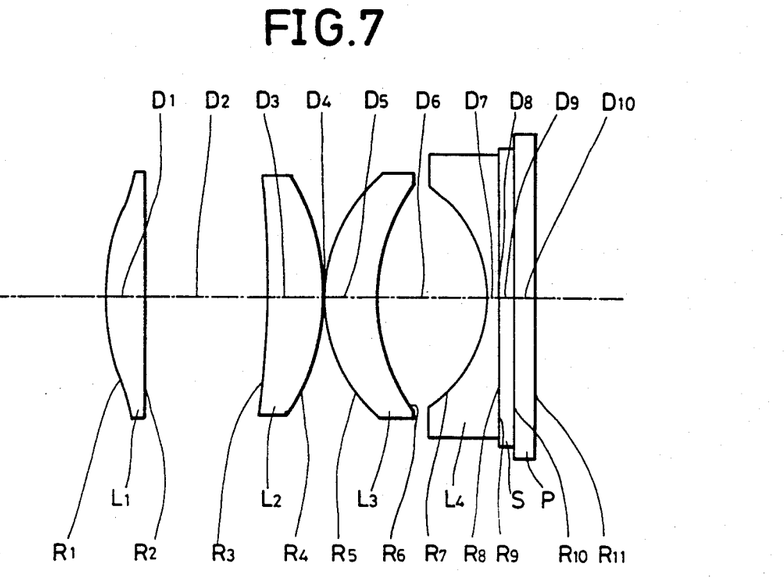
Figure 8:
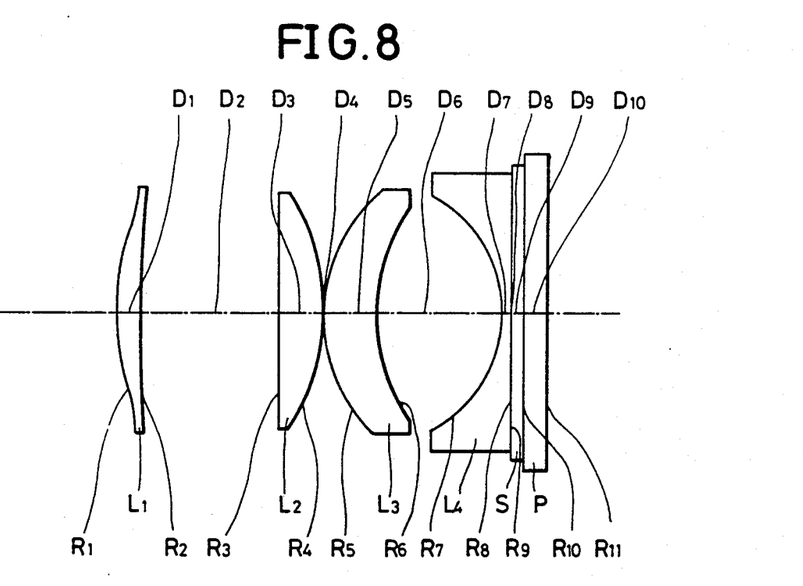
Figure 9:
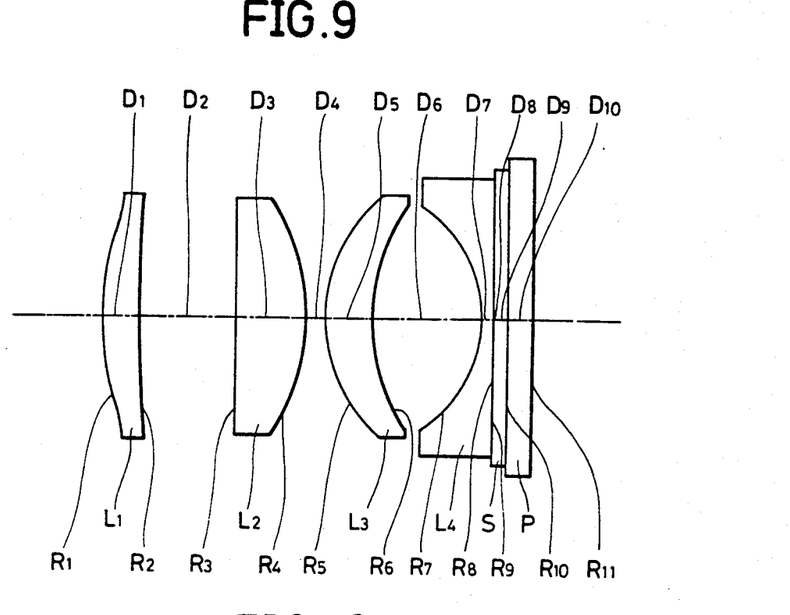
Figure 10:
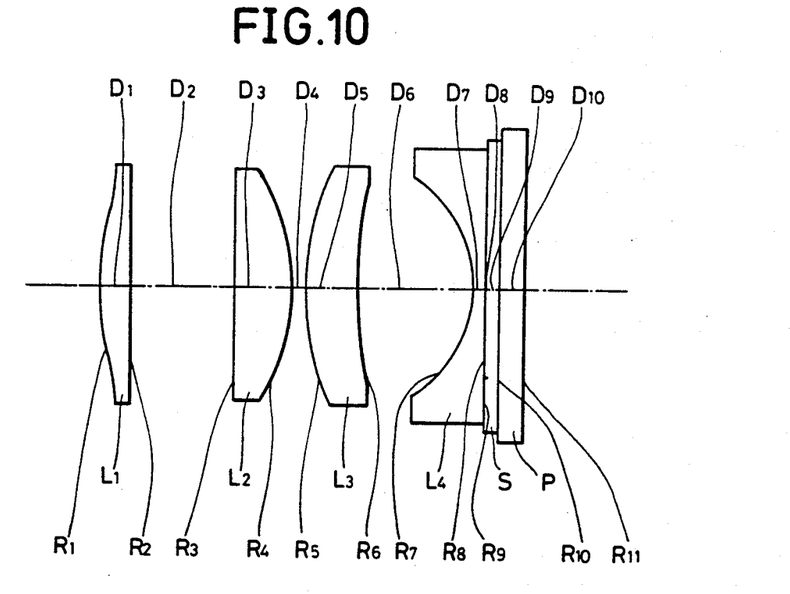
Figure 11:
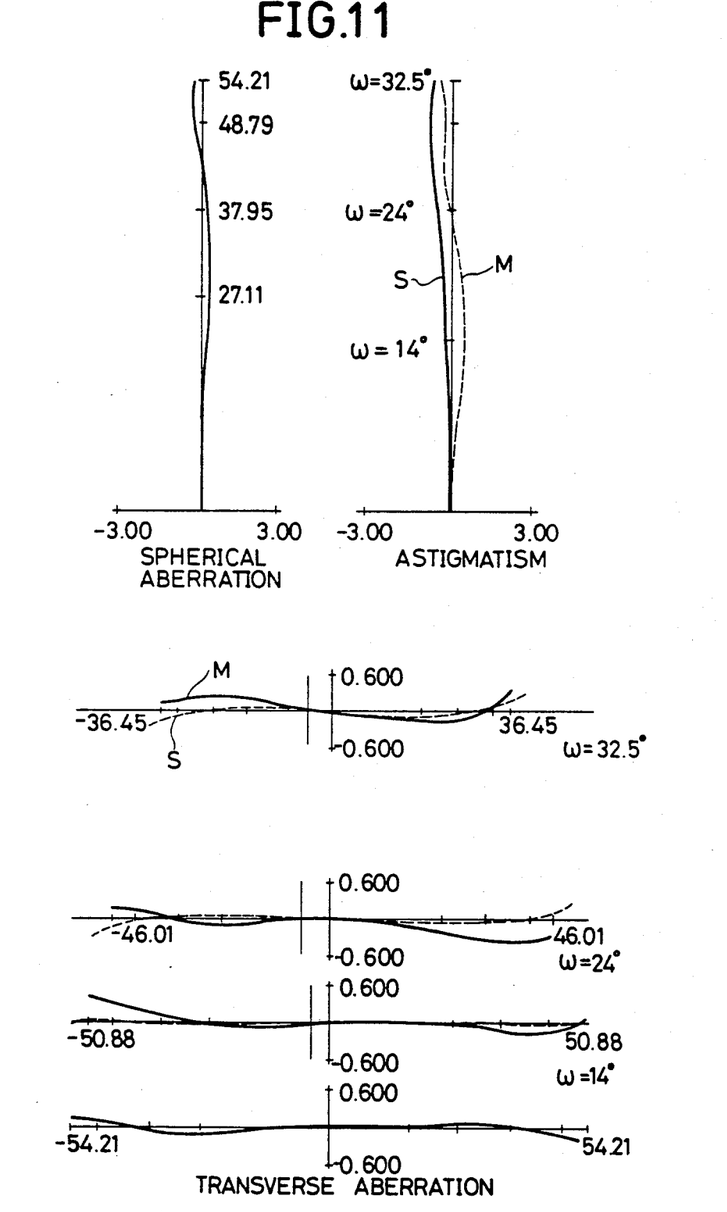
Figure 12:
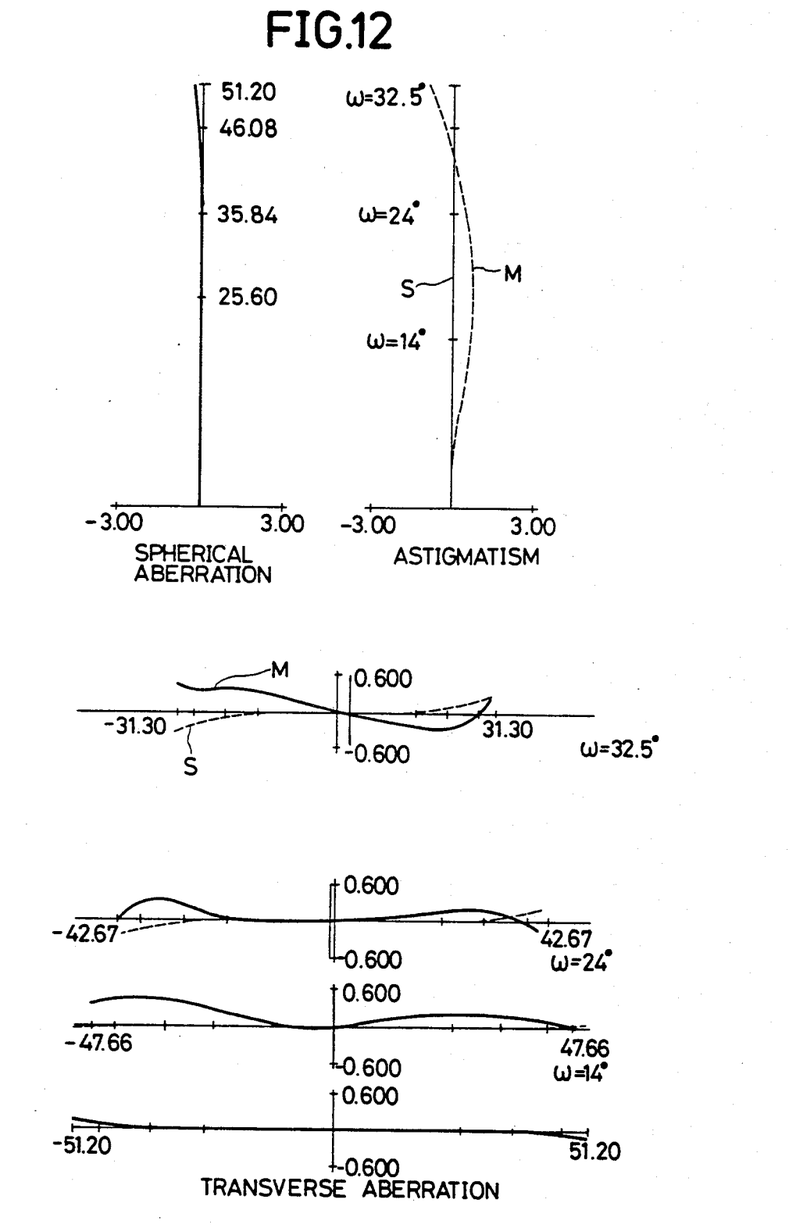
Figure 13:
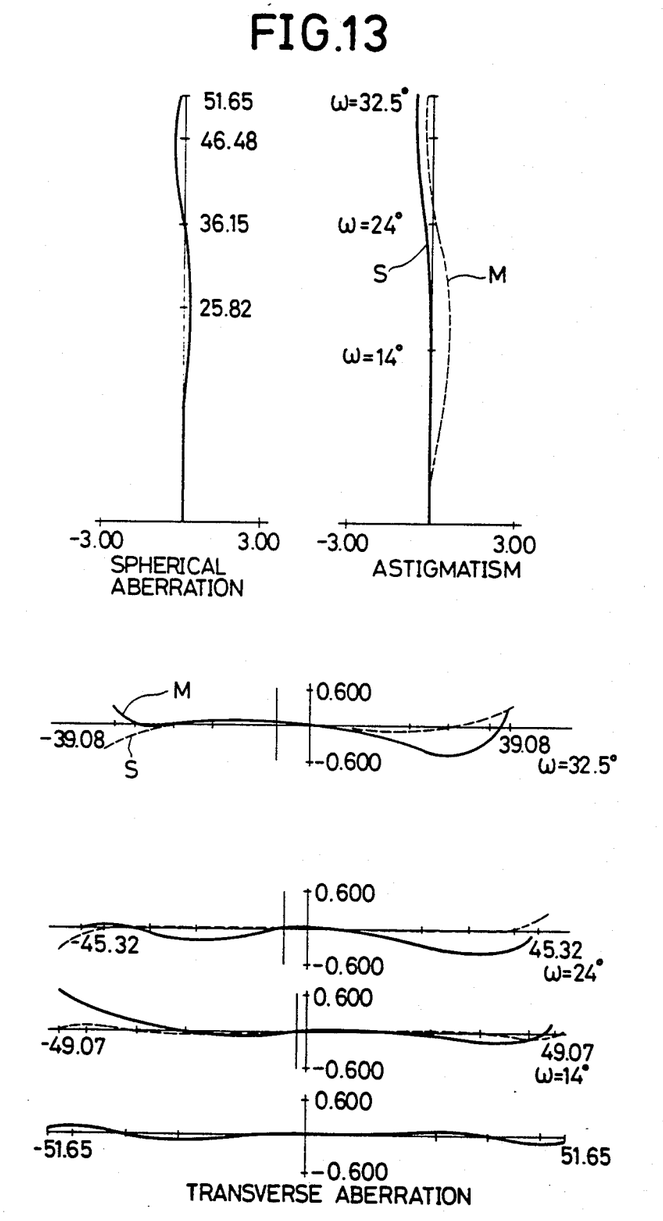
Figure 14:
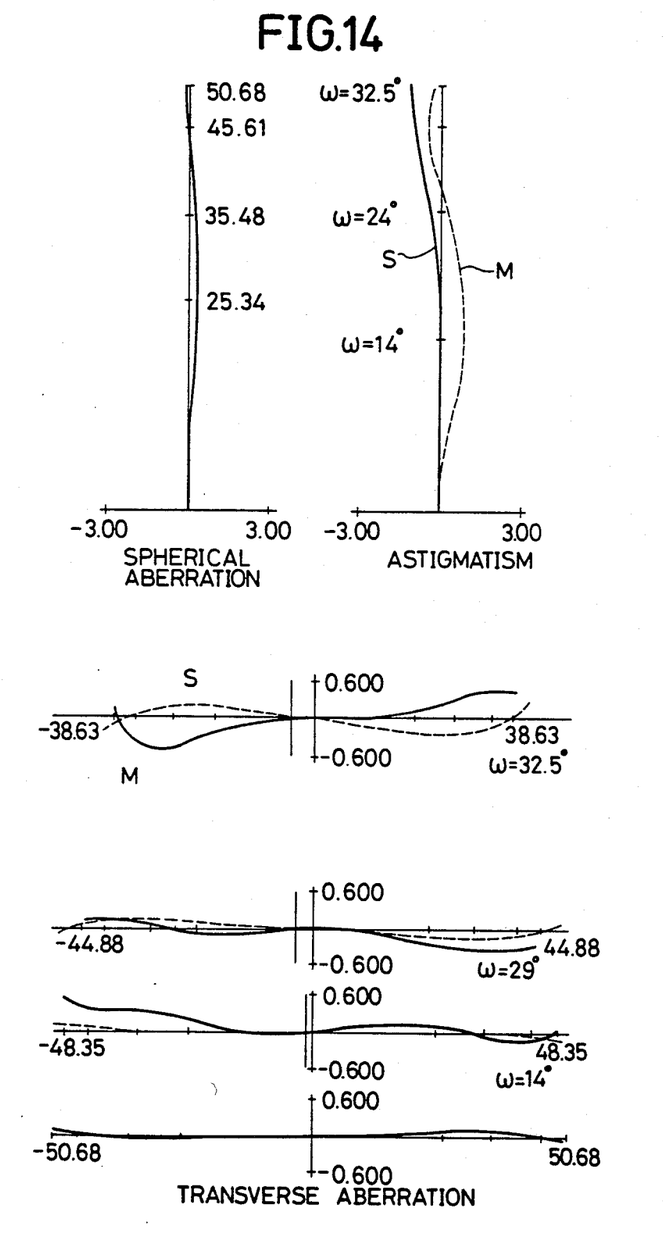

FIGS. 4, 5 and 6 are graphs showing aberration curves (spherical aberration, astigmatism and transverse aberration) of the first to third embodiments, respectively. Reference symbol M denotes a meridional image surface; and S, a sagittal image surface.

Another high-performance projection lens will be described hereinafter. This projection lens comprises: a first lens having a positive refracting power; a second lens having refracting power and a convex surface which is located at the side of L2 nearer to the image and which has a larger curvature than that at the side of L2 nearer to the screen; a third lens which consists of a meniscus lens having a concave surface located at the side of L3 nearer to the image; and a fourth lens having a concave surface which is located at the side of L4 nearer to the screen and which has a larger curvature than that at the side of the image. The first to fourth lenses are arranged from the side of the screen in the order named. At least one nonspherical surface is provided in the first lens, and at least one nonspherical surface is provided in the second, third and fourth lenses. If the focal length of the entire system is F, the refracting power of the entire system is $\phi$, the combined refracting power of the second and third lenses is $\phi_{2,3}$, the radius of curvature of the surface of the second lens which is located at the side of L2 nearer to the screen is $R_3$, the radius of curvature of the surface of the third lens which is located at the side of L3 nearer to screen is $R_5$, and the radius of curvature of the surface of the third lens which is located at the side of L3 nearer to the image is $R_6$, then the projection lens satisfies the following conditions:

$0.75 < \phi_{2,3}/\phi < 0.90$ (1)

$0.4F < D_2 < 0.6F$ (2)

$-300F < R_3 < -5F$ (a negative sign indicates a concave shape toward the screen)

$0.45 < R_5/R_6 < 0.85$ (4)

The operation of the projection lens having the above arrangement will be described hereinafter.

The first lens has at least one nonspherical surface for correcting aberration depending mainly on an aperture of the lens. The second lens comprises a meniscus lens for minimizing out-of-axis aberration, especially coma and halo causing flare. The second lens has the positive refracting power for mainly focusing. The third lens comprises the meniscus lens having at least one nonspherical surface and the concave surface facing the imaging tube and minimizes aberration of the optical axis thereof, thereby correcting aberration depending on the view angle, and out-of-axis aberration, especially coma. The fourth lens has the concave surface with a large curvature at the side of the lens nearer to the screen so as to correct view angle dependent aberration, especially, curvature of field and distortion. It should be noted that the third lens comprises a concentric lens having a concave surface located at the side of L3 nearer to the imaging tube.

Spherical aberration and coma are corrected by the first lens, coma is corrected by the third lens, and the curvature of field and distortion are corrected by the fourth lens. In particular, the meniscus lens as a third lens can properly correct coma. Since the meniscus lens has a concentric or substantially concentric shape, aberrations on the optical axis can be minimized, thereby providing a high-performance projection lens.

The significance of the upper and lower limits in each condition will be described below.

Condition (1) is associated with a combined refracting power of the second and third lens. When the combined refracting power is below the lower limit, the refracting power of the first lens must be increased excessively and spherical aberration cannot be corrected. However, when the combined refracting power exceeds the upper limit, out-of-axis aberration markedly occurs in the second and third lenses, especially the second lens, and proper correction cannot be performed for the following reason. When the positive power of the second and third lenses is increased, the negative power of the fourth lens must be increased to correct the curvature of field, thereby increasing distortion or the like and hence failing to provide a high-performance projection lens.

Condition (2) is associated with the distance between the first lens and the second lens. When the distance is below the lower limit, the focusing power of the out-of-axis light components becomes insufficient. A higher power of the out-of-axis light components for the second, third and fourth lenses is required. As a result, a wide-angle projection lens cannot be easily provided. However, when the distance exceeds the upper limit, the angle of incidence of out-of-axis light on the rear surface (i.e., the surface on the side of the lens nearer to the imaging tube) of the second lens is increased. As a result, out-of-axis aberration is increased.

Condition (3) is associated with the radius of curvature of the front surface of the second lens. When the radius is below the lower limit, i.e., when the surface comprises a convex surface, a difference between a refractive index for the light components above the axis and for those below the axis is increased, so that aberration, especially halo causing flare is increased. However, when the radius exceeds the upper limit, the negative refracting power is increased and the positive refracting power on the rear surface of the second lens or the positive refracting powers of the first and third lenses must be increased, thereby increasing spherical aberration and coma, thus failing to provide a high-performance projection lens with a low F number and a large half view angle.

Condition (4) is associated with a power ratio of the radius of curvature of the front surface of the third lens to that of the rear surface thereof and a meniscus property. If the ratio is below the lower limit, the power of the third lens is increased to increase aberrations on the axis and out of axis. As a result, the principal object (i.e., coma correction) cannot be achieved. However, when the ratio exceeds the upper limit, the power of the third lens is greatly reduced, and a higher power is required in the second lens. As a result, aberration caused by the second lens is increased and fails to correct distortion.

The lens data of the embodiments of the present invention will be described below. Reference symbols $R_1$, $R_2$, ... denote radii of curvature of the surfaces of the lenses, respectively; $D_1$, $D_2$, ..., thicknesses or air gaps between every two surfaces of every two adjacent lenses, respectively; $N_1$, $N_2$, ..., refractive indices of the lenses with respect to an e line (light with a wavelength of 546.1 nm), respectively; and $v_1$, $v_2$, ..., Abbe's numbers, respectively. The shape of the nonspherical surface is representd by a displacement $\bar{x}$ along the optical axis when the optical axis is defined as the x-axis in the orthogonal coordinate system as follows:

$$\bar{x} = R\{1 - \sqrt{(1 = H^2/R^2)}\} + AH^2 + BH^4 + CH^6 + DH_8 + EH^{10} + A'H^3 + B'H^5 + C'H^7 + D'H^9$$

where
H: the height from the optical axis
R: the radius of curvature at the vertex A, B, C, D, E, A', B', C' and D': the nonspherical coefficient.

FIGS. 7 to 10 are sectional views of projection lenses of the first to third embodiment, respectively. Referring to FIGS. 7 to 10, the focal length is given as 100. A liquid S is filled between the projection lens and the imaging tube having a faceplate P.

FIGS. 11 to 14 are graphs showing aberration correction states, respectively. Reference symbol M denotes a meridional image surface; and S, a sagittal image surface.

Fourth Embodiment (FIG. 7)
F = 100    F No. = 1:1.2    $2\omega = 65°$

| | | | |
|---|---|---|---|
| R1 = 115.06 | D1 = 16.14 | N1 = 1.49375 | v1 = 57.4 |
| R2 = 2539.40 | D2 = 50.59 | | |
| R3 = −479.60 | D3 = 23.93 | N2 = 1.60548 | v2 = 60.7 |
| R4 = −99.49 | D4 = 0.16 | | |
| R5 = 69.56 | D5 = 21.84 | N3 = 1.49375 | v3 = 57.4 |
| R6 = 94.56 | D6 = 45.67 | | |
| R7 = −57.19 | D7 = 4.80 | N4 = 1.51825 | v4 = 64.1 |
| R8 = ∞ | D8 = 0.11 | | |
| R9 = ∞ | D9 = 5.85 | N5 = 1.44200 | v5 = 55.8 |
| R10 = ∞ | D10 = 10.46 | N6 = 1.54212 | v6 = 59.5 |
| R11 = 4795.98 | | | |

| | First Surface | Sixth Surface |
|---|---|---|
| A | $7.05 \times 10^{-4}$ | 0 |
| B | $-1.99 \times 10^{-7}$ | $7.51 \times 10^{-7}$ |
| C | $-3.05 \times 10^{-11}$ | $-4.04 \times 10^{-10}$ |
| D | $3.00 \times 10^{-15}$ | $2.27 \times 10^{-13}$ |
| E | $-2.06 \times 10^{-18}$ | $-4.57 \times 10^{-17}$ |
| A' | 0 | $-3.73 \times 10^{-6}$ |
| B' | 0 | $-7.32 \times 10^{-11}$ |
| C' | 0 | $-1.09 \times 10^{-12}$ |
| D' | 0 | $-3.07 \times 10^{-17}$ |

Fifth Embodiment (FIG. 8)
F = 100    F No. = 1:1.2    $2\omega = 65°$

| | | | |
|---|---|---|---|
| R1 = 136.47 | D1 = 9.76 | N1 = 1.49375 | v1 = 57.4 |
| R2 = 599.41 | D2 = 59.89 | | |
| R3 = −30105.01 | D3 = 19.61 | N2 = 1.60542 | v2 = 60.7 |
| R4 = −103.24 | D4 = 0.15 | | |
| R5 = 73.72 | D5 = 26.18 | N3 = 1.49375 | v3 = 57.4 |
| R6 = 106.11 | D6 = 51.29 | | |
| R7 = −55.75 | D7 = 5.02 | N4 = 1.51825 | v4 = 64.1 |
| R8 = ∞ | D8 = 0.2 | | |
| R9 = ∞ | D9 = 6.12 | N5 = 1.44200 | v5 = 55.6 |
| R10 = ∞ | D10 = 10.94 | N6 = 1.54212 | v6 = 59.5 |
| R11 = 5017.50 | | | |

| | First Surface | Sixth Surface |
|---|---|---|
| A | $3.12 \times 10^{-4}$ | 0 |
| B | $-2.30 \times 10^{-7}$ | $5.61 \times 10^{-7}$ |
| C | $-6.19 \times 10^{-11}$ | $-3.94 \times 10^{-10}$ |
| D | $3.24 \times 10^{-15}$ | $2.27 \times 10^{-13}$ |
| E | $-2.69 \times 10^{-18}$ | $-5.45 \times 10^{-17}$ |
| A' | 0 | $-7.39 \times 10^{-7}$ |
| B' | 0 | $-1.94 \times 10^{-11}$ |
| C' | 0 | $-1.31 \times 10^{-12}$ |
| D' | 0 | $-1.18 \times 10^{-16}$ |

Sixth Embodiment (FIG. 9)
F = 100    F No. = 1:1.2    $2\omega = 65°$

| | | | |
|---|---|---|---|
| R1 = 122.59 | D1 = 15.23 | N1 = 1.49375 | v1 = 57.4 |
| R2 = 784.82 | D2 = 40.02 | | |
| R3 = −10583.12 | D3 = 29.61 | N2 = 1.60548 | v2 = 60.7 |
| R4 = −95.66 | D4 = 9.75 | | |
| R5 = 73.75 | D5 = 19.16 | N3 = 1.49375 | v3 = 57.4 |
| R6 = 88.75 | D6 = 46.90 | | |
| R7 = −56.94 | D7 = 4.88 | N4 = 1.51825 | v4 = 64.1 |
| R8 = ∞ | D8 = 0.54 | | |
| R9 = ∞ | D9 = 5.95 | N5 = 1.44200 | v5 = 55.8 |
| R10 = ∞ | D10 = 10.63 | N6 = 1.54212 | v6 = 59.5 |
| R11 = 4876.57 | | | |

| | First Surface | Sixth Surface |
|---|---|---|
| A | $4.34 \times 10^{-4}$ | 0 |
| B | $-3.34 \times 10^{-7}$ | $6.26 \times 10^{-7}$ |
| C | $-5.10 \times 10^{-11}$ | $-4.08 \times 10^{-10}$ |
| D | $2.68 \times 10^{-15}$ | $2.38 \times 10^{-13}$ |
| E | $-4.39 \times 10^{-18}$ | $5.22 \times 10^{-17}$ |
| A' | 0. | $-1.65 \times 10^{-6}$ |
| B' | 0. | $-2.53 \times 10^{-9}$ |
| C' | 0. | $-2.26 \times 10^{-13}$ |

-continued

| D' | 0. | $-1.36 \times 10^{-16}$ |

Seventh Embodiment (FIG. 10)
F = 100   F No. = 1:1.2   2ω = 65°

| | | | |
|---|---|---|---|
| R1 = 160.52 | D1 = 12.23 | N1 = 1.49375 | ν1 = 57.4 |
| R2 = 32829.77 | D2 = 43.17 | | |
| R3 = −10545.30 | D3 = 24.75 | N2 = 1.60548 | ν2 = 60.7 |
| R4 = −97.15 | D4 = 5.00 | | |
| R5 = 116.62 | D5 = 23.06 | N3 = 1.49375 | ν3 = 57.4 |
| R6 = 241.06 | D6 = 50.41 | | |
| R7 = −55.53 | D7 = 4.86 | N4 = 1.51825 | ν4 = 64.1 |
| R8 = ∞ | D8 = 0.17 | | |
| R9 = ∞ | D9 = 5.93 | N5 = 1.44200 | ν5 = 55.8 |
| R10 = ∞ | D10 = 10.59 | N6 = 1.54212 | ν6 = 59.5 |
| R11 = 4859.14 | | | |

| | First Surface | Sixth Surface |
|---|---|---|
| A | $5.54 \times 10^{-4}$ | 0 |
| B | $-3.27 \times 10^{-7}$ | $4.20 \times 10^{-7}$ |
| C | $-6.63 \times 10^{-11}$ | $-4.45 \times 10^{-10}$ |
| D | $2.22 \times 10^{-15}$ | $2.17 \times 10^{-13}$ |
| E | $-3.03 \times 10^{-18}$ | $-3.77 \times 10^{-17}$ |
| A' | 0. | $4.62 \times 10^{-7}$ |
| B' | 0. | $-2.07 \times 10^{-9}$ |
| C' | 0. | $-1.23 \times 10^{-12}$ |
| D' | 0. | $9.67 \times 10^{-17}$ |

Coma (degrading the performance of the projection lens) as well as spherical aberration, curvature of field and distortion can be properly corrected to provide a high-performance projection lens having an F number of less than 1.2 and a half view angle of 32° or more.

In each embodiment, the first and third lenses are made of plastic, and second and fourth lenses are made of glass.

With this arrangement, the overall weight of the projection lens can be decreased and changes in performance due to changes in ambient temperatures can be controlled with high precision.

I claim:

1. A projection lens for projecting an image onto a screen, comprising:
    a first lens having a positive refracting power;
    a second lens having a positive refracting power and a convex surface which is located at the side of said second lens nearer to the image and which has a larger curvature than that at the side of said second lens nearer to the screen; a third lens which consists of a meniscus lens having a concave surface located at the side of said third lens nearer to the image; and
    a fourth lens having a concave surface which is located at the side of said fourth lens nearer to the screen and which has a larger curvature than that at the side of said fourth lens nearer to the image, said first to fourth lenses being arranged, respectively, from a side of the screen in the order named, the combined refracting power of said second and third lenses being larger than the refracting power of said first lens, at least one nonspherical surface being provided in said first lens, and at least one other nonspherical surface being provided in said second, third and fourth lenses.

2. A projection lens according to claim 1, wherein said at least one other nonspherical surface is provided in at least one of said second and third lenses.

3. A projection lens for enlarging an image onto a screen, comprising:
    a first lens having a positive refracting power;
    a second lens having a positive refracting power and a convex surface which is located at the side of said second lens nearer to said image and which has a larger curvature than that at the side of said second lens nearer to the screen;
    a third lens which consists of a meniscus lens having a concave surface located at the side of said third lens nearer to the image; and
    a fourth lens having a concave surface which is located at the side of said fourth lens nearer to the screen and which has a larger curvature than that at the side of said fourth lens nearer to the image, said first to fourth lenses being arranged, respectively, from a side of the screen in the order named, at least one nonspherical surface being provided in said first lens, at least one other nonspherical surface being provided in said second, third and fourth lenses, and said projection lens satisfying the following conditions:

$$0.75 < \phi_{2,3}/\phi < 0.95 \quad (1)$$

$$0.4F < D_2 < 0.6F \quad (2)$$

$$0.45 < R_5/R_6 < 0.85 \quad (3)$$

where $\phi$ is the refracting power of an entire system, $\phi_{2,3}$ is the combined refracting power of said second and third lenses, $D_2$ is the distance between opposing surfaces of said first and second lenses, $R_5$ is the radius of curvature of the surface of said third lens which is located on the side nearer to the screen, $R_6$ is the radius of curvature of the surface of said third lens which is located on the side nearer to the image, and F is the focal length of the entire lens system.

4. A projection lens for enlarging an image onto a screen, comprising:
    a first lens having a positive refracting power;
    a second lens having a positive refracting power and a convex surface which is located at the side of said second lens nearer to the image and which has a larger curvature than that at the side of said second lens nearer to the screen;
    a third lens which consists of a meniscus lens having a concave surface located at the side of said third lens nearer to the image; and
    a fourth lens having a concave surface which is located at the side of said fourth lens nearer to the screen and which has a larger curvature than that at the side of said fourth lens nearer to the image, said first to fourth lenses being arranged, respectively, from a side of the screen in the order named, at least one nonspherical surface being provided in said first lens, at least one nonspherical surface being provided in said second, third and fourth lenses, and said projection lens satisfying the following conditions:

$$0.75 < \phi_{2,3}/\phi < 0.90 \quad (1)$$

$$0.4F < D_2 < 0.6F \quad (2)$$

$$-300F < R_3 < -5F \text{ (a negative sign indicates a concave shape toward the screen)} \quad (3)$$

$$0.45 < R_5/R_6 < 0.85 \quad (4)$$

where F is the focal length of the entire lens system, $\phi$ is the refracting power of the entire lens system, $\phi_{2,3}$ is the combined refracting power of said second and third lenses, $R_3$ is the radius of curvature of the surface of said second lens which is located at the side nearer to the screen, $R_5$ is the radius of curvature of the surface of the third lens which is located at the side nearer to the screen, and $R_6$ is the radius of curvature of the surface of said third lens which is located at the side nearer to the image.

5. A projection lens for projecting an image onto a screen, comprising:

a first lens having a positive refracting power;

a lens group having a second lens with a positive refracting power and a third lens having a refracting power of a smaller absolute value than that of the refracting power of the second lens; and, a fourth lens having a concave surface located at the side of said fourth lens nearer to the screen, said first lens, said lens group and said fourth lens being arranged, respectively, from a side of the screen in the order named, wherein the refracting power of said lens group is larger than that of said first lens, each of said first lens and said third lens comprises a plastic lens, and said second lens comprises a glass lens.

6. A projection lens according to claim 5, wherein the concave surface of said fourth lens is spherical.

* * * * *